(12) United States Patent
Nozawa

(10) Patent No.: US 11,675,314 B2
(45) Date of Patent: Jun. 13, 2023

(54) ELECTRONIC WATCH

(71) Applicant: SEIKO EPSON CORPORATION, Tokyo (JP)

(72) Inventor: Toshiyuki Nozawa, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 632 days.

(21) Appl. No.: 16/787,382

(22) Filed: Feb. 11, 2020

(65) Prior Publication Data
US 2020/0257249 A1    Aug. 13, 2020

(30) Foreign Application Priority Data

Feb. 12, 2019  (JP) .............................. JP2019-022568

(51) Int. Cl.
  *G04B 47/06* (2006.01)
  *G01C 21/08* (2006.01)
  *G04G 21/02* (2010.01)

(52) U.S. Cl.
  CPC .......... *G04B 47/065* (2013.01); *G01C 21/08* (2013.01); *G04G 21/02* (2013.01)

(58) Field of Classification Search
  CPC ...... G04B 21/02; G04B 47/065; G04G 21/02; G01C 21/08
  See application file for complete search history.

(56) References Cited

U.S. PATENT DOCUMENTS

| | | | |
|---|---|---|---|
| 5,790,477 A | 8/1998 | Hauke | |
| 8,725,414 B2 * | 5/2014 | Matsuda | G01C 21/26 701/487 |
| 10,067,477 B2 * | 9/2018 | Poguntke | G01C 21/20 |
| 2002/0141289 A1 | 10/2002 | Hayek et al. | |
| 2012/0243383 A1 * | 9/2012 | Honda | G04R 20/04 368/47 |

(Continued)

FOREIGN PATENT DOCUMENTS

| | | |
|---|---|---|
| CN | 103322998 A | 9/2013 |
| JP | 2000-105286 A | 4/2000 |

(Continued)

*Primary Examiner* — Sean Kayes
(74) *Attorney, Agent, or Firm* — Oliff PLC

(57) ABSTRACT

An electronic watch includes a navigation processor that perform navigation processing of causing a positioning processor to perform positioning processing, and calculating a distance to a destination based on current position information acquired by the positioning processing and destination position information, and also calculating a direction of the destination based on current position information, geomagnetism, and destination position information, and moreover causing a display unit to display the direction of the destination, and an operation device configured to case the navigation processor to start navigation processing when a predetermined operation is performed. The navigation processor performs, when the distance is longer than a preset threshold, the navigation processing at a first frequency during a predetermined time after predetermined operation is performed, and performs, when the distance is shorter than or equal to a preset threshold, the navigation processing at a second frequency higher than first frequency during the predetermined time.

4 Claims, 10 Drawing Sheets

(56) References Cited

U.S. PATENT DOCUMENTS

| | | | |
|---|---|---|---|
| 2013/0051185 A1* | 2/2013 | Honda | G04G 19/08 |
| | | | 368/47 |
| 2013/0052977 A1* | 2/2013 | Akiyama | G01S 19/34 |
| | | | 455/344 |
| 2013/0245935 A1 | 9/2013 | Matsuda et al. | |
| 2016/0259304 A1* | 9/2016 | Fujisawa | G04G 19/00 |
| 2017/0254647 A1 | 9/2017 | Nozawa | |
| 2017/0277139 A1 | 9/2017 | Nozawa | |
| 2019/0393715 A1* | 12/2019 | Yamakawa | G04C 10/02 |

FOREIGN PATENT DOCUMENTS

| | | |
|---|---|---|
| JP | 2000-512014 A | 9/2000 |
| JP | 2009-092506 A | 4/2009 |
| JP | 2013-195196 A | 9/2013 |
| JP | 2017-146111 A | 8/2017 |
| JP | 2017-161251 A | 9/2017 |
| JP | 2017-181075 A | 10/2017 |

\* cited by examiner

ELECTRONIC WATCH

The present application is based on, and claims priority from JP Application Serial Number 2019-022568, filed Feb. 12, 2019, the disclosure of which is hereby incorporated by reference herein in its entirety.

BACKGROUND

1. Technical Field

The present disclosure relates to an electronic watch.

2. Related Art

Japanese Unexamined Patent Application Publication No. 2017-161251 discloses an electronic watch in which position coordinates of a destination are preliminarily registered and which periodically updates display of the direction of the destination, the direction of the true north, and a distance to the destination by using calculation of current position coordinates using satellite signals transmitted from a GPS, an operation of determining the direction of the true north using output from a magnetic sensor, the position coordinates of the destination, and results of the calculation and the operation. Additionally, Japanese Unexamined Patent Application Publication No. 2017-161251 discloses that, for power saving, when a user remains at the same position, with only orientation changed, the calculation of the current position coordinates using satellite signals may be performed only once, and only the operation of determining the direction of the true north using the output from the magnetic sensor may be performed periodically.

However, in Japanese Unexamined Patent Application Publication No. 2017-161251, when the current position coordinates are acquired periodically using the GPS, there is a problem in that acquisition of the position coordinates using the GPS involves high power consumption, leading to increased consumption of a battery.

Additionally, when the current position coordinates are acquired only once using the GPS in order to reduce the consumption of the battery, there is a problem in that the direction of the destination may fail to be displayed correctly when the user moves toward the destination because the position coordinates are acquired using only the current position and the user is not assumed to use the watch while moving.

SUMMARY

An electronic watch according to an aspect of the present disclosure includes a receiver configured to receive a satellite signal, a positioning processor configured to acquire, based on the received satellite signal, current position information including latitude information and longitude information of a current position, a magnetic sensor configured to detect geomagnetism, a destination storage unit configured to store destination position information including latitude information and longitude information of a destination, a navigation processor configured to perform navigation processing of causing the positioning processor to perform positioning processing, and calculating a distance to the destination based on the current position information acquired by the positioning processing and the destination position information, and also calculating a direction of the destination based on the current position information, the geomagnetism, and the destination position information, and moreover causing a display unit to display the direction of the destination, and an operation device configured to use the navigation processor to start the navigation processing when a predetermined operation is performed, wherein the navigation processor performs, when the distance is longer than a preset threshold, the navigation processing at a first frequency during a predetermined time after the predetermined operation is performed, and performs, when the distance is shorter than or equal to a preset threshold, the navigation processing at a second frequency higher than the first frequency during the predetermined time.

The electronic watch according to the aspect of the present disclosure may include a battery configured to supply power and a battery remaining amount detector configured to detect a battery remaining amount of the battery, and the navigation processor may perform the navigation processing at the second frequency when the distance is shorter than or equal to a preset threshold and a detected value detected by the battery remaining amount detector is larger than a preset threshold.

The electronic watch according to the aspect of the present disclosure may include a solar cell and a power generation amount detector configured to detect a power generation amount of the solar cell, and the navigation processor may perform the navigation processing at the second frequency when the distance is shorter than or equal to a preset threshold and a detected value detected by the power generation amount detector is larger than a preset threshold.

In the electronic watch according to the aspect of the disclosure, the navigation processor may display the distance to the destination on the display unit in the navigation process.

DESCRIPTION OF EXEMPLARY EMBODIMENTS

First Embodiment

An electronic watch 1 according to a first exemplary embodiment of the present disclosure will be described below based on the drawings.

Figure 1:
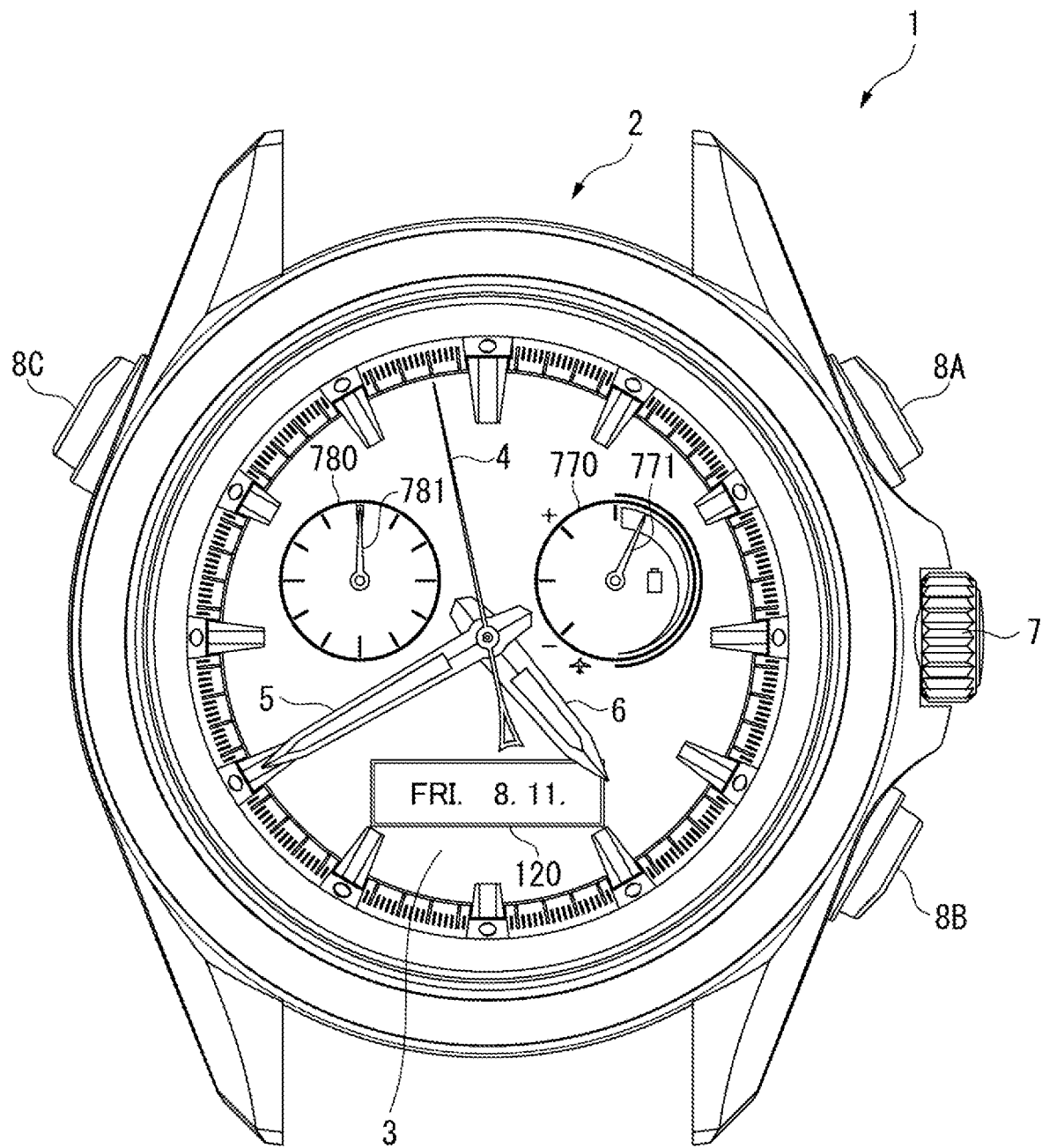
FIG. 1 is a front view illustrating an electronic watch according to a first embodiment.

FIG. 1 is a front view illustrating the electronic watch 1 according to the present embodiment.

The electronic watch 1 according to the present embodiment is configured to receive radio waves of satellite signals transmitted from a plurality of position information satellites such as GPS satellites or quasi-zenith satellites that circle over the earth around a predetermined orbit to acquire position information including latitude information and longitude information.

Additionally, the electronic watch 1 includes a navigation function for navigation to the destination.

Electronic Watch

As illustrated in FIG. 1, the electronic watch 1 includes an outer packaging case 2, a dial 3, a seconds hand 4, a minute hand 5, and an hour hand 6.

Additionally, the outer packaging case 2 is provided with a crown 7, an A button 8A, a B button 8B, and a C button 8C. The A button 8A is provided in a 2 o□clock direction with respect to the planar center of the dial 3, the B button 8B is provided in a 4 o□clock direction with respect to the planar center of the dial 3, and the C button 8C is provided in a 10 o□clock direction with respect to the planar center of the dial 3.

The dial 3 is formed in a disk shape. Three rotary shafts are provided at the planar center of the dial 3, and the seconds hand 4, the minute hand 5, and the hour hand needle 6 are attached to the respective rotary shafts. Pointers 4 to 6 typically display the time of day. However, the seconds hand 4 indicates the north orientation when navigation processing is performed.

Additionally, the dial 3 includes two subdials. Specifically, as illustrated in FIG. 1, a circular, first small window 770 and a pointer 771 are provided in a 2 o□clock direction with respect to the planar center of the dial 3, and a circular, second small window 780 and a pointer 781 are provided in the 10 o□clock direction with reference to the planar center.

Furthermore, a rectangular, digital display unit 120 is provided in a 6 o□clock direction with respect to the center of the dial 3.

In the present embodiment, the pointer 771 in the first small window 770 is a mode needle indicating various information, and the pointer 781 in the second small window 780 is a destination orientation pointer indicating the direction of the destination.

Figure 2:
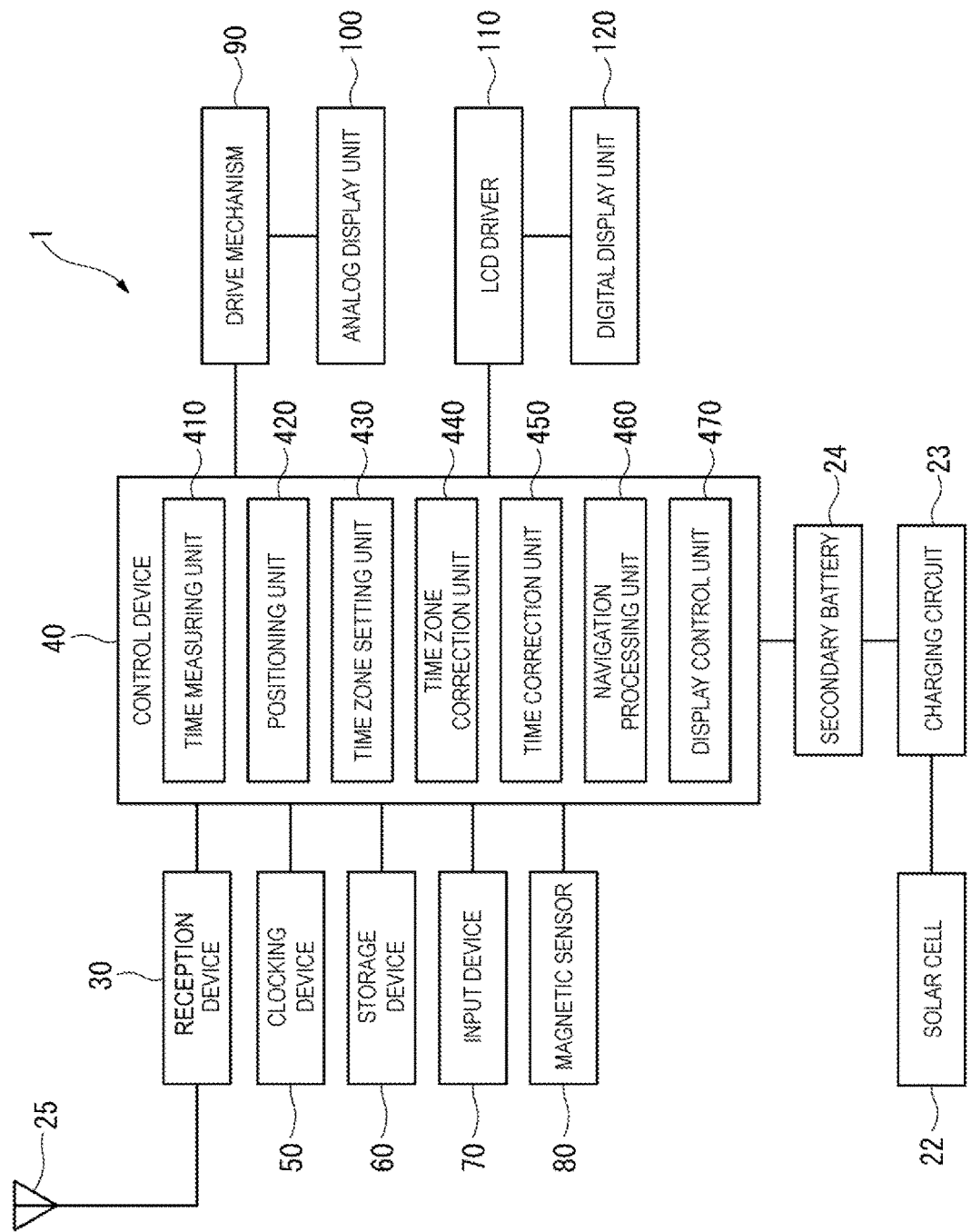
FIG. 2 is a block diagram illustrating a general configuration of the electronic watch according to the first exemplary embodiment.

The first small window 770 indicated by the pointer 771, which is a mode needle, displays a power indicator indicating the remaining amount of a secondary battery 24 illustrated in FIG. 2 and graduations indicating a setting of an airplane mode.

The power indicator is displayed in a band shape extending from a 12 o□clock position through a 3 o□clock position to a 6 o□clock position in the first small window 770, with the 12 o□clock position meaning Full and the 6 o□clock position meaning Empty. Additionally, an airplane mark indicating the airplane mode is displayed at a 7 o□clock position of the first small window 770.

Note that the first small window 770 indicated by the pointer 771 is not limited to the configuration described above. For example, the first small window 770 may display, depending on functions of the electronic watch 1, a symbol indicating a setting mode for a daylight saving time, a symbol meaning a mode in which a standard time is displayed, a symbol meaning a mode in which a daylight saving time is displayed, a symbol meaning a time measuring mode and a positioning mode in a reception mode.

The second small window 780 displays graduations corresponding to 12 portions into which the inner circumference of the window is split. Execution of the navigation processing causes the pointer 781 to indicate the direction of the destination using the graduations. For example, when the direction of the destination is east when viewed from the current position, with the electronic watch 1 oriented such that the seconds hand 4 indicating the north orientation is aligned with the 12 o'clock position, the pointer 781 indicates the graduation of the 3 o'clock position in the second small window 780. Additionally, with the electronic watch 1 oriented such that the seconds hand 4 is aligned with the 6 o□clock position, the pointer 781 indicates the graduation of a 9 o□clock position in the second small window 780. Specifically, the pointer 781 indicates the direction of the destination based on the north orientation.

Note that in the present embodiment, the dial 3, the first small window 770, the second small window 780, and the pointers 4 to 6, 771, and 781 constitute an analog display unit 100 illustrated in FIG. 2.

The digital display unit 120 displays various types of information. The digital display unit 120 typically displays a date and the day of the week. Details of information displayed by the digital display unit 120 will be described below.

General Configuration of Electronic Watch

FIG. 2 is a block diagram illustrating a general configuration of the electronic watch 1.

As illustrated in FIG. 2, the electronic watch 1 includes a solar cell 22, a charging circuit 23, a secondary battery 24, an antenna body 25, a reception device 30, a control device 40, a clocking device 50, a storage device 60, an input device 70, a magnetic sensor 80, a drive mechanism 90, an analog display unit 100, an LCD driver 110, a digital display unit 120, and the like.

The charging circuit 23 supplies power generated by the solar cell 22 to the secondary battery 24 to charge the secondary battery 24. Note that the secondary battery 24 is an example of the battery of the present disclosure.

The antenna body 25 is an antenna that receives satellite signals transmitted from the position information satellite, and includes a patch antenna in the present embodiment. However, the antenna body 25 is not limited to inclusion of the patch antenna, and may include, for example, a dipole antenna, an inverted-F antenna, a ring antenna, or the like.

The drive mechanism 90 includes a step motor driving the pointers 4 to 6, 771, and 781, a train wheel, a drive circuit, or the like.

The LCD driver 110 outputs a drive signal to the digital display unit 120.

Input Device

The input device 70 includes the crown 7 and the three buttons 8A, 8B, and 8C, as illustrated in FIG. 1. Operation of the input device 70 causes various types of processing to be performed based on the operations. Note that the input device 70 including the crown 7 and the three buttons 8A to 8C is an example of the operation device of the present disclosure.

Communication Device

When driven by the control device 40, the reception device 30 receives radio waves of satellite signals transmitted from the position information satellite through the antenna body 25. Specifically, the reception device 30 is an example of a receiver according to the present disclosure. When the reception of the radio wave of the satellite signal is successful, the reception device 30 transmits, to the control device 40, information such as time-of-day information acquired from the satellite signal, position information of each position information satellite acquired from the satellite signal, and the current position information calculated from the time-of-day information. On the other hand, when the reception of the satellite signal fails, the reception device 30 transmits the corresponding information to the control device 40. Note that the configuration of the reception device 30 is similar to that of a known GPS reception circuit, and thus descriptions of the configuration are omitted.

Clocking Device

The clocking device 50 includes a crystal oscillator and the like, and updates the time-of-day data using a reference signal based on an oscillation signal from the crystal oscillator.

Magnetic Sensor

The magnetic sensor 80 is, for example, a three-axis type magnetic sensor that measures the geomagnetism and outputs the measured geomagnetism to the control device 40.

Control Device

The control device 40 includes a CPU controlling the electronic watch 1. The control device 40 includes a time measuring unit 410, a positioning unit 420, a time zone setting unit 430, a time zone correction unit 440, a time-of-day correction unit 450, a navigation processing unit 460, and a display control unit 470.

Figure 3:
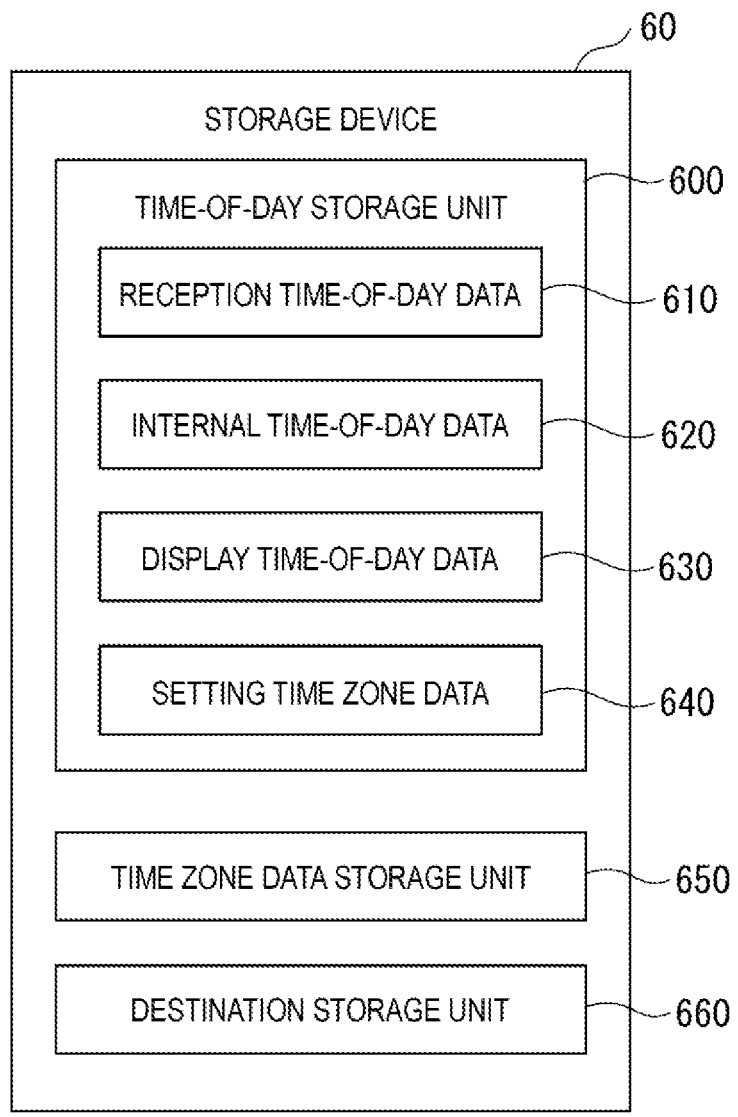
FIG. 3 is a block diagram illustrating a general configuration of a storage device according to the first exemplary embodiment.

FIG. 3 is a block diagram illustrating a general configuration of the storage device 60.

As illustrated in FIG. 3, the storage device 60 is configured with a RAM or the like, and includes a time-of-day data storage unit 600, a time zone data storage unit 650, and a destination storage unit 660.

The time-of-day data storage unit 600 stores reception time-of-day data 610, internal time-of-day data 620, display time-of-day data 630, and setting time zone data 640.

Referring back to FIG. 2, a configuration of the control device 40 will be described below.

The time measuring unit 410 operates the reception device 30 to capture at least one position information satellite, receives the radio wave of a satellite signal transmitted from the position information satellite, and acquires time-of-day information. In the present embodiment, the time measuring unit 410 is configured to perform reception processing in automatic reception processing and manual reception processing. Examples of automatic reception processing include automatic receiving processing of performing reception processing at a fixed reception time, light-irradiation automatic reception processing of performing reception processing when the solar cell 22 can be determined to be irradiated with sunlight outdoors, and the like.

The positioning unit 420 operates the reception device 30 to capture four, preferably five or more, position information satellites, receives the radio wave of a satellite signal transmitted from each position information satellite, and calculates and acquires current position information including latitude information and longitude information. Additionally, the positioning unit 420 can acquire time-of-day information simultaneously when the satellite signal is received. In the present embodiment, the positioning unit 420 is configured to perform reception processing in automatic reception processing and manual reception processing, similarly to the above-described time measuring unit 410. The positioning unit 420 is an example of a positioning processor according to the present disclosure.

When the position information is successfully acquired by the positioning unit 420, the time zone setting unit 430 sets the time zone data acquired from the time zone data storage unit 650 as the set time zone data 640 based on the acquired latitude information and the longitude information.

Additionally, when either time difference information or city information is selected by operation of the input device 70, the time zone setting unit 430 sets the time zone data corresponding to the selected time difference information or city information as the set time zone data 640.

When the time zone setting unit 430 sets the time zone data, the time zone correction unit 440 uses the set time zone data 640 to correct the display time-of-day data 630.

Thus, the display time-of-day data 630 indicates the time of day corresponding to internal time-of-day data 620 plus the setting time zone data 640.

When the time-of-day information is successfully acquired by the reception processing of the time measuring unit 410 or the positioning unit 420, the time-of-day correction unit 450 uses the acquired time-of-day information to correct the reception time-of-day data 610. Thus, the internal time-of-day data 620 and the display time-of-day data 630 are also corrected. When the display time-of-day data 630 is corrected, the indicated time of day of each of the pointers 4 to 6 synchronized with the display time-of-day data 630 is also corrected.

When a predetermined operation is performed on the input device 70, the navigation processing unit 460 performs destination registration control when the C button 8C is pressed for five seconds or longer, for example.

Additionally, when a predetermined operation is performed on the input device 70, the navigation processing unit 460 starts navigation control when the A button 8A is pressed for five seconds or more, for example.

The navigation processing unit 460 is an example of a navigation processor according to the present disclosure.

Note that details of destination registration processing and navigation processing will be described below.

The display control unit 470 controls the drive mechanism 90 and the LCD driver 110 to display time-of-day information and various types of information using the pointers 4 to 6, 771, and 781 and the digital display unit 120.

Destination Registration Control

Now, the destination registration control will be described below.

When the C button 8C is pressed for five seconds or longer and the destination registration control is started, the display control unit 470 controls the LCD driver 110 to display characters "REG.DEST". on the digital display unit 120. Note that "REG.DEST". is an abbreviation of Register Destination.

Additionally, the navigation processing unit 460 uses the positioning unit 420 to perform positioning processing. Thus, the navigation processing unit 460 acquires the current position information. Additionally, the display control unit 470 drives the LCD driver 110 to display characters "GPS" on the digital display unit 120 while the positioning processing is being performed, with the reception device 30 in operation.

The navigation processing unit 460 stores the acquired current position information in the destination storage unit 660 as destination position information. When the target position information is stored in the destination storage unit 660, the display control unit 470 drives the LCD driver 110 to display characters "DEST.REGD". on the digital display unit 120 for a constant amount of time, for example, 20 seconds. Note that "DEST.REGD". is an abbreviation of Destination Registered.

Then, the navigation processing unit 460 terminates the destination registration control.

Navigation Control

Figure 4:
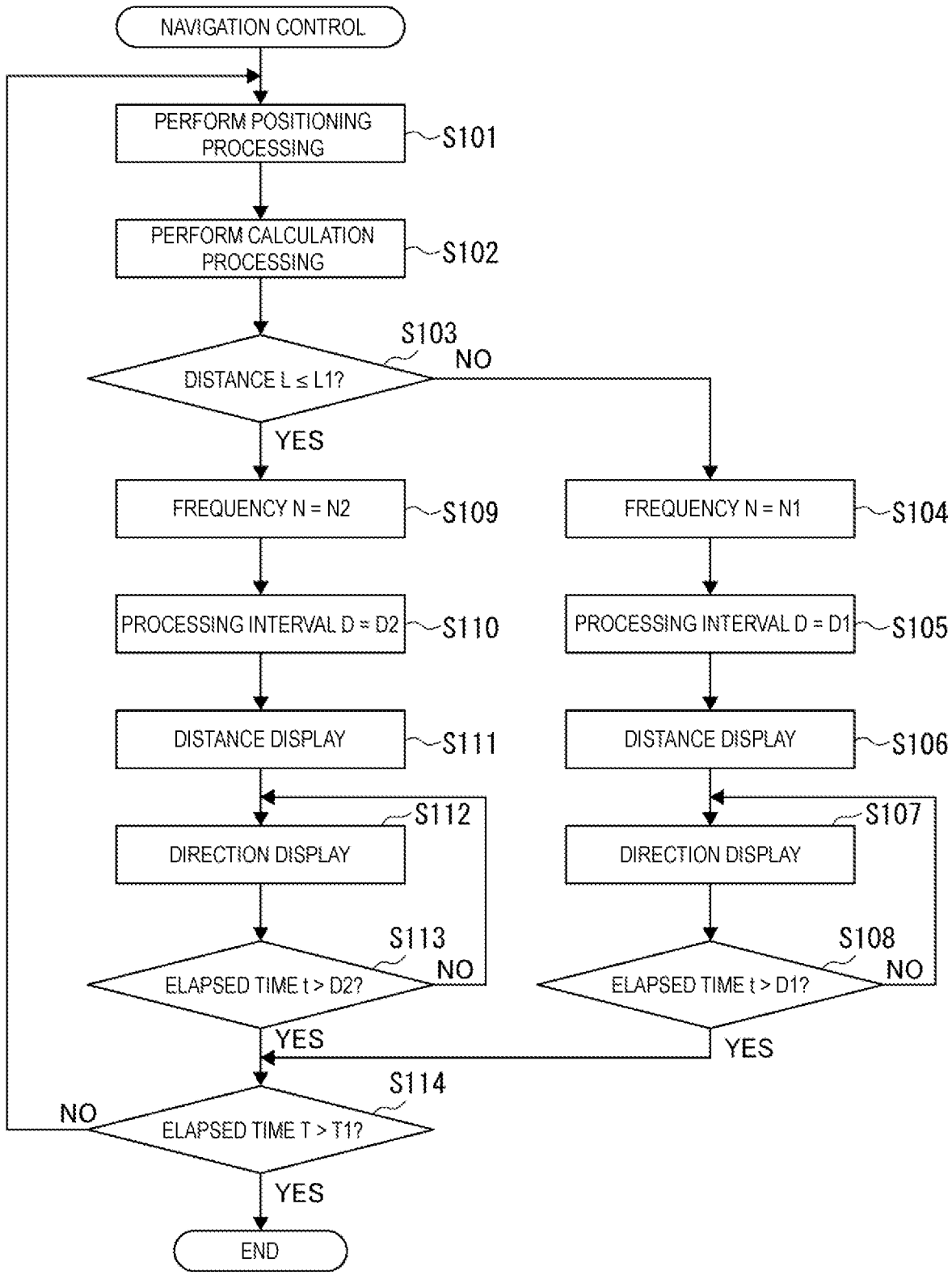
FIG. 4 is a flowchart illustrating navigation processing according to the first embodiment.

Navigation control will now be described based on the flowchart of FIG. 4.

In the present embodiment, when the A button 8A is pressed for five seconds or longer to start the navigation control, the navigation processing unit 460 performs navigation processing including the positioning processing, calculation processing, and display processing. Additionally, the navigation processing unit 460 continues the navigation control for a preset predetermined time T1. Note that the predetermined time T1 is set to, for example, three minutes. Note that the predetermined time T1 is not limited to three minutes, and may be set to three minutes or longer or shorter than 3 minutes.

Figure 5:
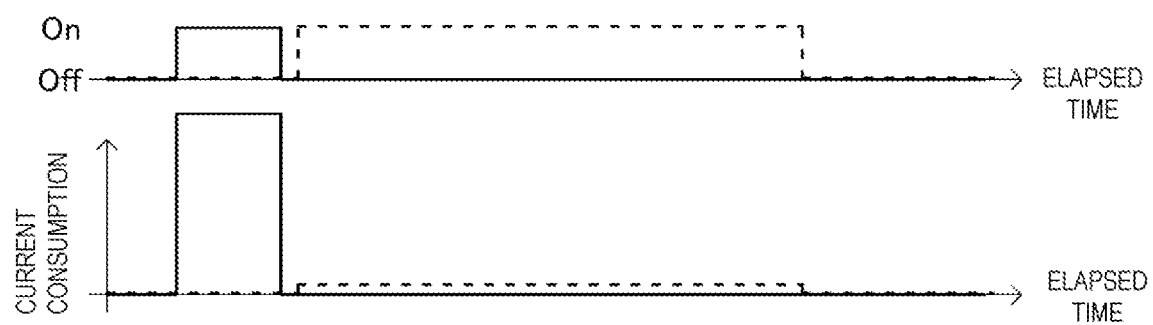
FIG. 5 is a diagram illustrating current consumption when the navigation processing is performed at a first frequency.

As illustrated in FIG. 5, when the A button 8A is pressed for five seconds or longer and the navigation control is started, the navigation processing unit 460 uses the positioning unit 420 to perform the positioning processing in step S101 to acquire the current position information. Additionally, the display control unit 470 drives the LCD driver 110 to display characters "GPS" on the digital display unit 120 while the positioning processing is being performed, with the reception device 30 in operation.

In this case, in the first positioning processing, the positioning unit 420 performs capture processing for capturing the position information satellite, and then performs signal reception processing for receiving a satellite signal from the captured position information satellite.

Then, in step S102, the navigation processing unit 460 performs the calculation processing. In the calculation processing, the navigation processing unit 460 calculates a distance L from the current position to the destination based on the coordinates in the current position information acquired in step S101 and the coordinates in the destination position information stored in the destination storage unit 660.

Additionally, based on the coordinates in the current position information and the coordinates in the destination position information, the navigation processing unit 460 calculates an azimuth of the destination with the north assumed as a reference orientation and a clockwise direction assumed to correspond to a positive angle. Then, the navigation processing unit 460 operates the magnetic sensor 80 to acquire the geomagnetism, and calculates the direction O of the destination based on the geomagnetism and the calculated azimuth. Specifically, the navigation processing unit 460 calculates the direction O of the destination based on the current position information, the destination position information, and the geomagnetism.

Furthermore, the navigation processing unit 460 calculates the north orientation based on the acquired geomagnetism.

Now, in step S103, the navigation processing unit 460 determines whether the distance L is shorter than a preset distance threshold L1. Note that, in the present embodiment, the distance threshold L1 is set to, for example, "300 m".

When the determination in step S103 is No, the navigation processing unit 460 sets a frequency N to N1 in step S104.

Specifically, the navigation processing unit 460 sets the number of times the navigation processing is performed during the predetermined time T1, that is, the frequency N of the navigation processing, to N1. Note that, in the present embodiment, N1 is set to once. Specifically, the navigation processing unit 460 sets once as the frequency at which the positioning processing, the calculation processing, and the display processing are performed during three minutes, that is, the predetermined time T1. Note that N1 is an example of a first frequency in the present disclosure.

Then, in step S105, the navigation processing unit 460 sets a processing interval D, which is the interval for performing the positioning processing, to a processing interval D1=T1/N1=3 minutes. In other words, the navigation processing unit 460 sets three minutes as the processing interval D for performing the positioning processing in order to set the frequency N of the navigation processing to once at predetermined time T1.

Then, in step S106, the navigation processing unit 460 uses the display control unit 470 to perform display processing of displaying the distance L.

Specifically, the display control unit 470 controls the LCD driver 110 to display the calculated distance L on the digital display unit 120.

Then, in step S107, the navigation processing unit 460 uses the display control unit 470 to perform display processing of displaying the direction O of the destination on a display unit.

Specifically, the display control unit 470 controls the drive mechanism 90 to indicate, using the pointer 781, the direction O calculated in the calculation processing. Note that the analog display unit 100 and the digital display unit 120 are examples of the display unit according to the present disclosure.

Furthermore, the display control unit 470 controls the drive mechanism 90 to indicate the north orientation using the seconds hand 4.

At this time, the navigation processing unit 460 operates the magnetic sensor 80 to acquire the geomagnetism at a fixed time interval, for example, one-second interval, and calculates the north orientation based on the acquired geomagnetism. Then, the display control unit 470 controls the drive mechanism 90 to indicate the north orientation at one-second interval using the seconds hand 4 and to indicate the direction O of the destination using the pointer 781. In other words, in step S107, the directions in the north orientation and the direction O of the destination are updated at one-second interval.

Note that the navigation processing unit 460 is not limited to acquisition of the geomagnetism at one-second interval but may acquire the geomagnetism, for example, at 10-second interval. In this case, the indications of the north orientation and the direction O of the destination are updated at 10-second interval.

Then, in step S108, the navigation processing unit 460 determines whether an elapsed time t since the execution of the last positioning processing has exceeded the processing interval D1, that is, whether three minutes have passed since the execution of the last positioning processing.

When the determination in step S108 is No, the navigation processing unit 460 returns to step S107, in other words, the navigation processing unit 460 updates the north orientation and the direction O of the destination at one-second interval until the determination in step S108 is Yes.

On the other hand, when the determination in step S108 is Yes, the navigation processing unit 460 performs processing in step S114 described below.

The processing returns to step S103, and when the determination in step S103 is Yes, the navigation processing unit 460 sets the frequency N to N2 in step S109. Note that, in the present embodiment, N2 is set to 180 times, that is, a larger value than N1. Specifically, the navigation processing unit 460 sets 180 times as the frequency N at which the positioning processing, the calculation processing, and the display processing are performed during three minutes, that is, the predetermined time T1. Note that N2 is an example of a second frequency according to the present disclosure.

Then, in step S110, the navigation processing unit 460 sets the processing interval D2=T1/N2=1 seconds to the processing interval D, which is the interval for performing the positioning processing. In other words, the navigation processing unit 460 sets one second to the processing interval D for performing the positioning processing for 180 times of the frequency N of the navigation processing at predetermined time T1.

Then, in step S111, the navigation processing unit 460 uses the display control unit 470 to display the distance L, as is the case with the above-described step S106.

Then, in step S112, the navigation processing unit 460 uses the display control unit 470 to display the direction O of the destination, as is the case with the above-described step S107.

Then, in step S113, the navigation processing unit 460 determines whether the elapsed time t since the execution of the last positioning processing has exceeded the processing interval D2, that is, whether one second has passed since the execution of the last positioning processing.

When the determination in step S113 is No, the navigation processing unit 460 returns to step S112.

When the determination in step S113 or step S108 is Yes, the navigation processing unit 460 determines, in step S114, whether the elapsed time T since the start of the navigation control, in other words, since the pressing of the A button 8A for five seconds or longer has exceeded three minutes, that is, the predetermined time period T1.

When the determination in step S114 is No, the processing returns to step S101, and the processing from steps S101 to S114 is repeated.

In other words, when the distance L calculated in the calculation processing is shorter than or equal to the distance threshold L1, navigation processing including the positioning processing, the calculation processing, and the display processing is performed at one-second interval. Thus, in this case, the distance L and the azimuth of the destination are updated at one second interval. At this time, the positioning unit 420 does not perform the capture processing in the second and subsequent positioning processing, and performs only signal reception processing on the position information satellite captured in the first positioning processing.

On the other hand, when the distance L calculated in the calculation processing is longer than the distance threshold L1, the navigation processing including the positioning processing, the calculation processing, and the display processing is performed once during the predetermined time T1. Thus, in this case, the distance L and the azimuth are not updated. Note that the direction O of the destination continues to be displayed at a constant angle based on the north orientation, in other words, at an azimuth calculated by the calculation processing based on the orientation indicated by the seconds hand 4. Thus, when the user changes the orientation of the electronic watch 1 and the seconds hand 4 indicating the north orientation correspondingly moves, the pointer 781, which is a destination orientation pointer, also moves to keep the same angle with respect to the seconds hand 4.

On the other hand, when the determination in step S114 is Yes, the navigation control is ended.

When the navigation control is ended, the display control unit 470 controls the drive mechanism 90 to display, using the seconds hand 4, the seconds of the time of day stored in the display time-of-day data 630, while indicating the 12 o□clock position in the second small window 780 using the pointer 781 to. Additionally, the display control unit 470 controls the LCD driver 110 to display the date and the day of the week on the digital display unit 120.

FIG. 5 is a diagram illustrating On period and current consumption of the reception device 30 and the magnetic sensor 80 observed when the distance L is longer than the distance threshold L1. Note that, in FIG. 5, the On period and the current consumption of the reception device 30 are illustrated by solid lines, and the On period and the current consumption of the magnetic sensor 80 are illustrated by the dotted lines.

As illustrated in FIG. 5, when the distance L is longer than the distance threshold L1, the frequency N of the navigation processing is set to once, and thus the reception device 30 is initially turned on and subsequently turned off when the first positioning processing is ended. Thus, current consumed by the reception device 30 first increases and is then zeroed.

On the other hand, the magnetic sensor 80 is turned on after the reception device 30 is turned off. Then, the magnetic sensor 80 remains in the On state until navigation control is ended. Thus, the navigation processing unit 460 acquires the geomagnetism at one-second interval.

Note that the current consumed by the magnetic sensor 80 is very small compared to the current consumed by the reception device 30. Accordingly, even when the magnetic sensor 80 remains in the On state until the navigation control is ended, power consumption is prevented from increasing.

Figure 6:
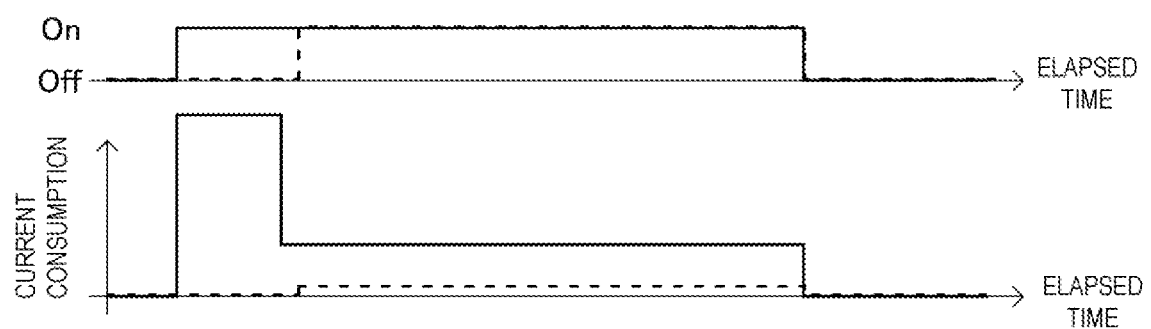
FIG. 6 is a diagram illustrating current consumption when the navigation processing is performed at a second frequency.

FIG. 6 is a diagram illustrating the On period and current consumption of the reception device 30 and magnetic sensor 80 observed when the distance L is shorter than or equal to the distance threshold L1. Note that, in FIG. 6, the On period and the current consumption of the reception device 30 are illustrated by solid lines, and the On period and the current consumption of the magnetic sensor 80 are illustrated by dotted lines.

As illustrated in FIG. 6, when the distance L is shorter than or equal to the distance threshold L1, the frequency N of navigation processing is set to 180 times, and the reception device 30 remains in the On state after the navigation control is started and before the navigation control is ended. However, as described above, when the positioning unit 420 performs the positioning processing while capturing the position information satellite, the positioning unit 420 does not perform the capture processing but only the signal reception processing on the captured position information satellite. In other words, since the capture processing is not performed in the second and subsequent positioning processing, the current consumption of the reception device 30 in the second and subsequent positioning processing is reduced.

Additionally, the magnetic sensor 80 is turned on after the first positioning processing has ended. Then, the magnetic sensor 80 remains in the On state until navigation control is ended.

Advantageous Effects of First Embodiment

According to the present embodiment, the following advantageous effects can be produced.

In the present embodiment, the electronic watch 1 includes the navigation processing unit 460 performing the navigation processing of using the positioning unit 420 to perform positioning processing, calculating the distance L to the destination based on the current position information acquired by the positioning processing and the destination position information, calculating the direction O of the destination based on the current position information, the geomagnetism, and the destination position information, and displaying the distance L and the direction O to the destination. Then, when the distance L is longer than the preset distance threshold L1, the navigation processing unit 460 performs the navigation processing at a frequency of once during the predetermined time T1. Then, when the distance L is shorterthan or equal to the preset distance threshold L1, the navigation processing unit 460 performs the navigation processing at a frequency of 180 times during the predetermined time T1.

Thus, the navigation processing unit 460 decreases the frequency at which the navigation processing is performed when the distance L is longer than the distance threshold L1, that is, when the distance L from the current position to the destination is long. This allows the consumption of the secondary battery 24 to be suppressed. In this case, when the distance L from the current position to the destination is long, slight distance movement of the user around the current position does not lead to a significant change in the direction from the current position to the destination. Thus, even when the navigation processing is performed at a low frequency, the direction O from the current position to the destination can be continuously displayed with the required precision.

Additionally, when the distance L is shorter than or equal to the distance threshold L1, in other words, when the distance L from the current position to the destination is short, the frequency is increased at which the navigation processing unit 460 performs the navigation process. Thus, even when movement of the user around the current position leads to a significant change in the direction from the current position to the destination, the distance L and the direction O from the current position to the destination can be accurately displayed because, each time the navigation processing is performed, the distance L and the direction O are calculated with the current position information updated.

In this way, in the present embodiment, the frequency at which the navigation processing is performed is changed in accordance with the distance L from the current position to the destination. Thus, convenience for the user can be improved and the current consumption can be suppressed.

In the present embodiment, the navigation processing unit 460 operates the magnetic sensor 80 to acquire the geomagnetism at one-second interval, and calculates the north orientation based on the acquired geomagnetism. Based on this, the display control unit 470 controls the drive mechanism 90 to indicate the north orientation at one-second interval using the seconds hand 4, and the direction O of the destination remains displayed at a constant angle with reference to the north orientation. Thus, when the user changes the orientation of the electronic watch 1 and the seconds hand 4 indicating the north orientation correspondingly moves while the navigation processing is not being performed, the pointer 781, which is a destination orientation pointer, also moves to keep the same angle with respect to the seconds hand 4. Accordingly, the convenience for the user can be improved.

Second Embodiment

Now, a second embodiment will be described below on the basis of drawings in FIG. 7 and FIG. 8.

The second embodiment differs from the first embodiment in that a primary battery 26A is used as a power source for an electronic watch 1A, and a battery remaining amount detection unit 27A is provided that detects the battery remaining amount of the primary battery 26A.

Note that the same components as those of the electronic watch 1 in the first embodiment are denoted by the same reference signs, and descriptions of the components are omitted.

General Configuration of Electronic Watch

Figure 7:
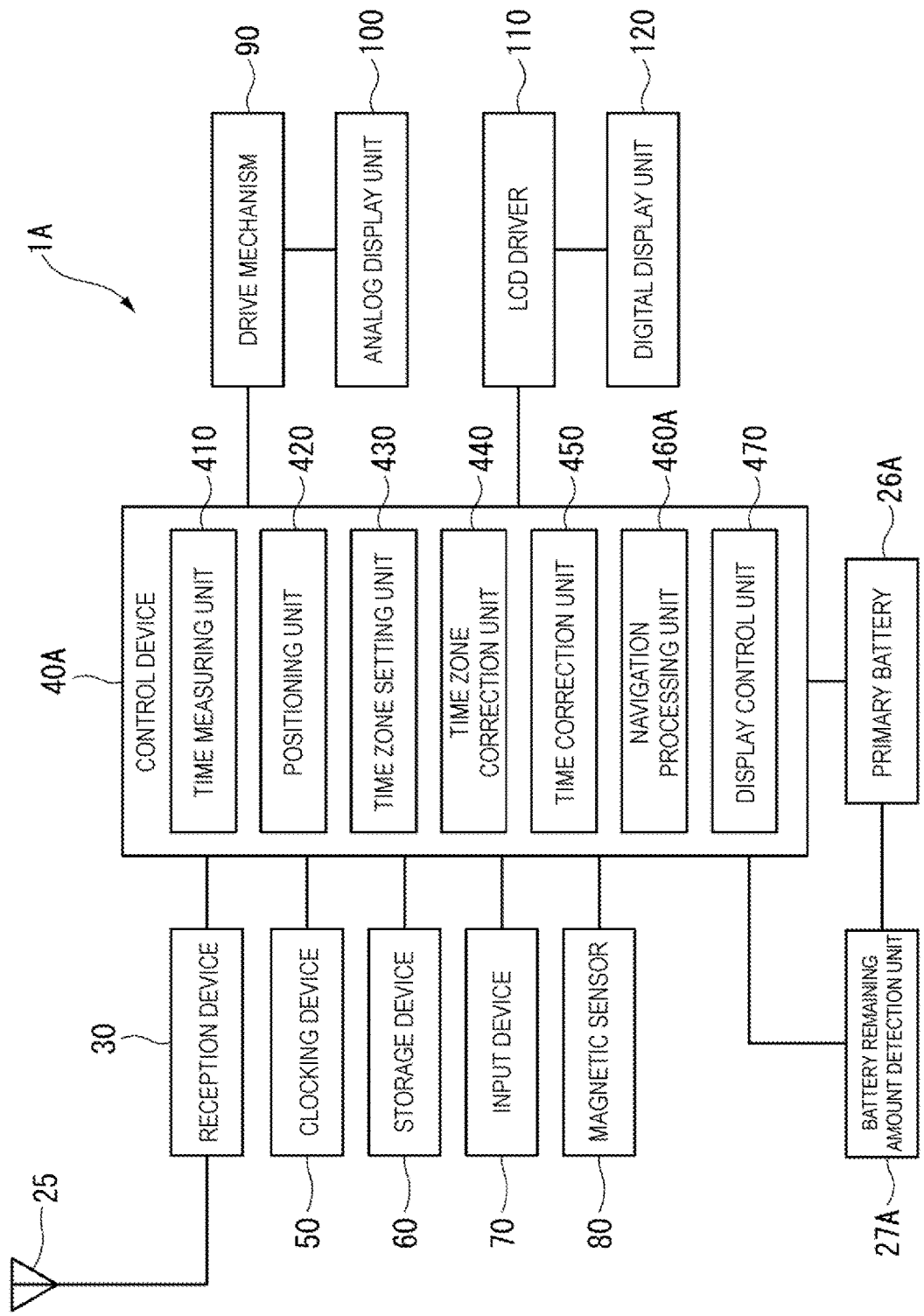
FIG. 7 is a diagram illustrating a general configuration of an electronic watch according to a second embodiment.

FIG. 7 is a block diagram illustrating a general configuration of the electronic watch 1.

As illustrated in FIG. 7, the electronic watch 1A includes the primary battery 26A configured to supply power, and the battery remaining amount detection unit 27A configured to detect a battery remaining amount W of the primary battery 26A. The battery remaining amount detection unit 27A outputs the detected battery remaining amount W of the primary battery 26A to a control device 40A.

Note that the primary battery 26A is an example of the battery according to the present disclosure and the battery remaining amount detection unit 27A is an example of the battery remaining amount detector according to the present disclosure.

Navigation Control

Figure 8:
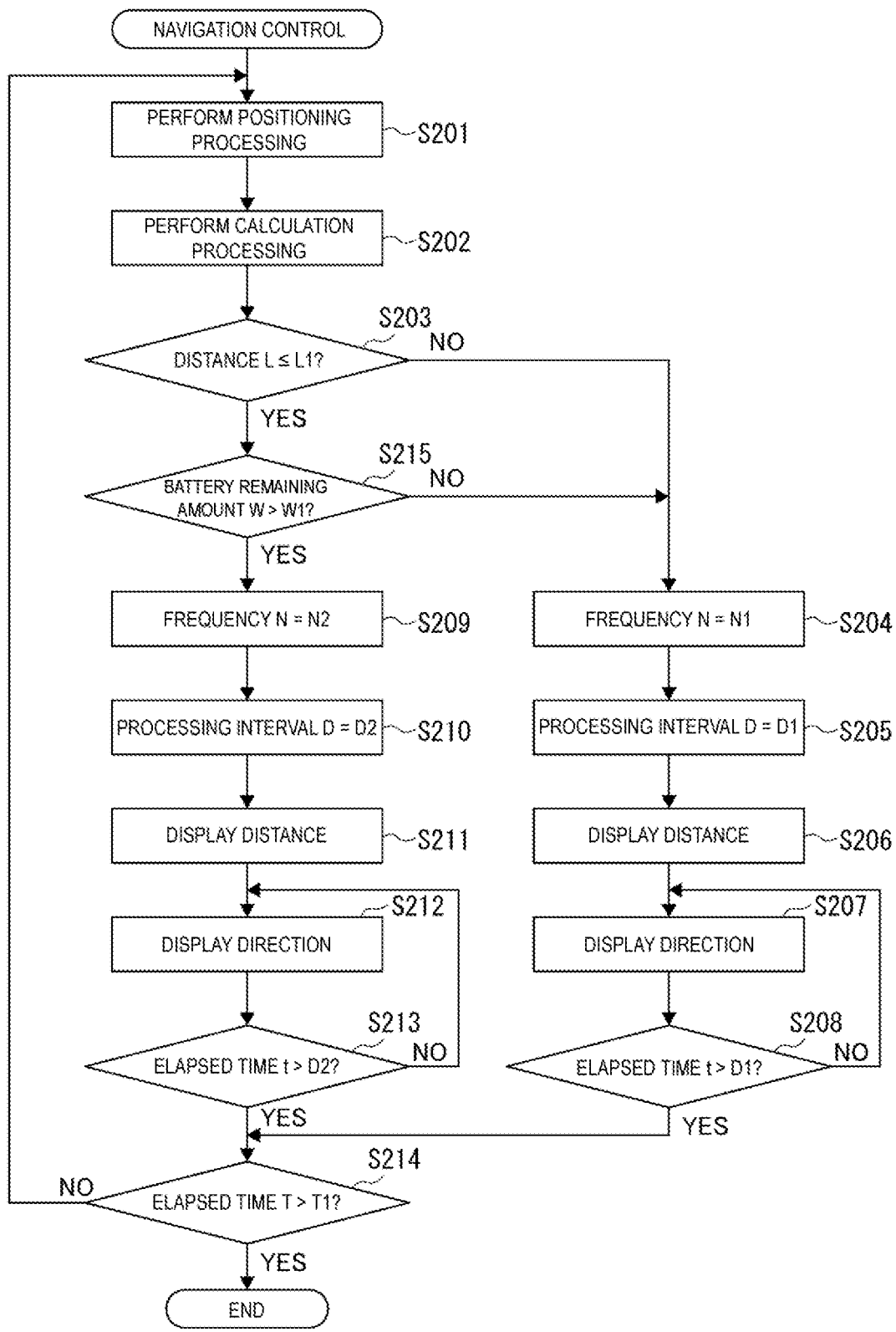
FIG. 8 is a flowchart illustrating navigation processing according to the second embodiment.

FIG. 8 is a flowchart illustrating navigation control according to the second embodiment. Note that, in the second embodiment, steps S201 to S214 are similar to steps S101 to S114 of the first embodiment described above, and thus descriptions of the steps S201 to S214 are omitted.

As illustrated in FIG. 8, when the determination in step S203 is Yes, a navigation processing unit 460A determines, in step S215, whether the battery remaining amount W detected by the battery remaining amount detection unit 27A is larger than a preset battery remaining amount threshold W1.

In this case, when the frequency N of the navigation processing is set to 180 times, that is, N2, the battery remaining amount threshold W1 is set to a value at which the electronic watch 1A is prevented from going down, for example, 10 mAh.

Then, when the determination in step S215 is Yes, the navigation processing unit 460A sets the frequency N to 180 times, that is, N2, in step S209. Accordingly, when the battery remaining amount W detected by the navigation processing unit 460A and the battery amount detection unit 27A is larger than the battery remaining threshold W1, the frequency at which the navigation processing is performed is increased.

On the other hand, when the determination in step S215 is No, the navigation processing unit 460A sets the frequency N to once, that is, N1, in step S204. Thus, the navigation processing unit 460A reduces the frequency at which the navigation processing is performed when the battery remaining amount W detected by the battery amount detection unit 27A is smaller than or equal to the battery remaining threshold W1.

Advantageous Effects of Second Embodiment

According to the present embodiment, the following advantageous effects can be produced.

In the present embodiment, the electronic watch 1A includes the primary battery 26A as a power source for supplying power, and the battery remaining amount detection unit 27A configured to detect the battery remaining amount W of the primary battery 26A. The navigation processing unit 460A sets the frequency N to 180 times, that is, N2, when the distance L is shorter than or equal to the distance threshold L1 and the battery remaining amount W detected by the battery amount detection unit 27A is larger than the preset battery remaining amount threshold W1. On the other hand, the navigation processing unit 460A sets the frequency N to once, that is, N1, when the battery remaining amount W detected by the battery amount detection unit 27A is smaller than or equal to the preset battery remaining amount threshold W1.

Thus, the navigation processing unit 460A also switches, depending on the battery remaining amount W, the frequency N at which the navigation processing is performed. This allows suppression of an unwanted decrease in battery remaining amount W, which may cause the electronic watch 1A to go down.

Third Embodiment

Now, a third embodiment will be described below on the basis of drawings in FIG. 9 and FIG. 10.

The third embodiment differs from the first embodiment in that a power generation amount detection unit 28B is provided that detects a power generation amount P of the solar cell 22.

Note that the same components as those of the electronic watch 1 in the first embodiment are denoted by the same reference signs, and descriptions of the components are omitted.

General Configuration of Electronic Watch

Figure 9:
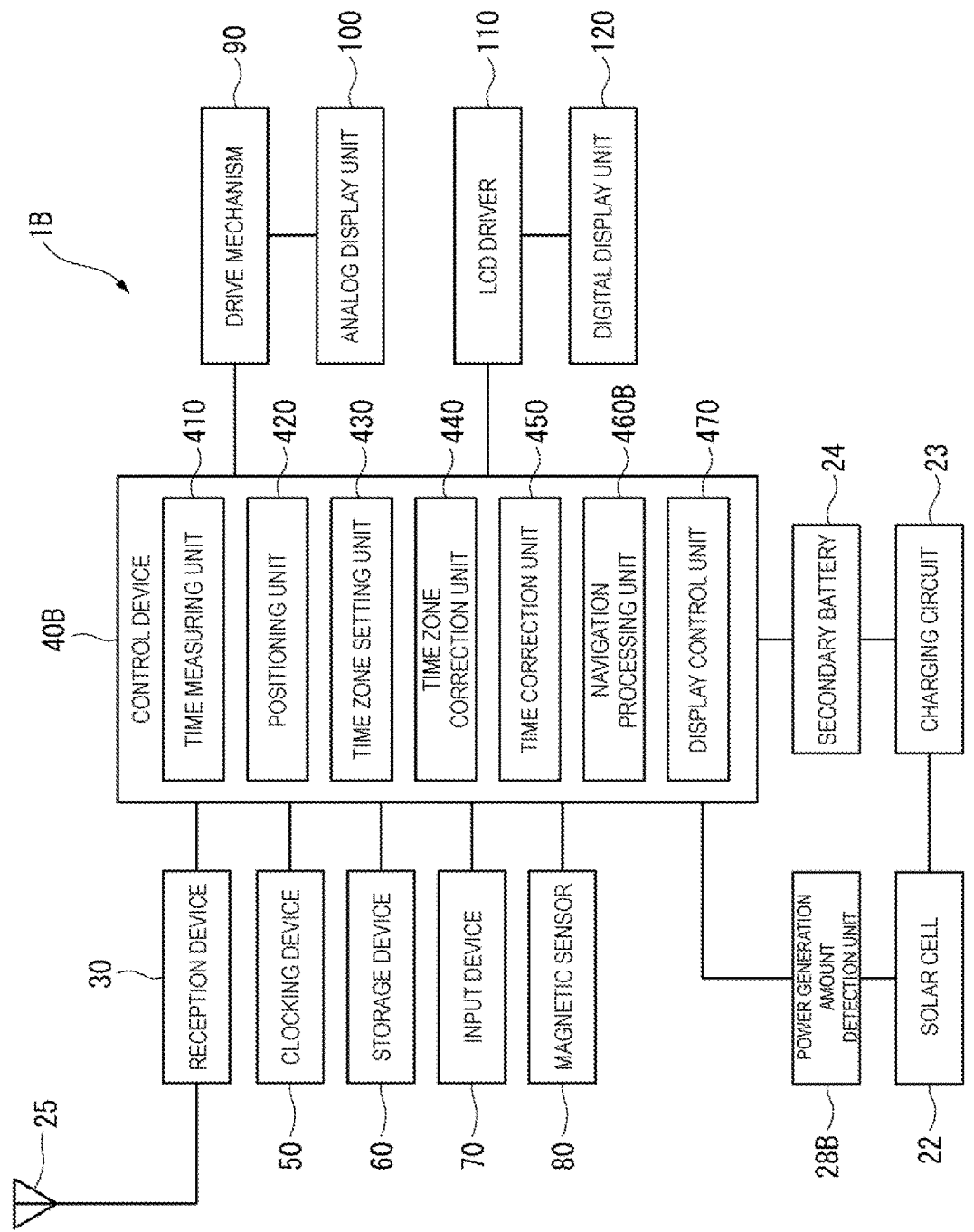
FIG. 9 is a diagram illustrating a general configuration of an electronic watch according to a third embodiment.

FIG. 9 is a block diagram illustrating a general configuration of an electronic watch 1B.

As illustrated in FIG. 7, the electronic watch 1B includes a power generation amount detection unit 28B configured to detect the power generation amount P of the solar cell 22. The power generation amount detection unit 28B outputs the detected power generation amount P of the solar cell 22 to the control device 40B. Note that the power generation amount detection unit 28B is an example of a power generation amount detector according to the present disclosure.

Navigation Control

Figure 10:
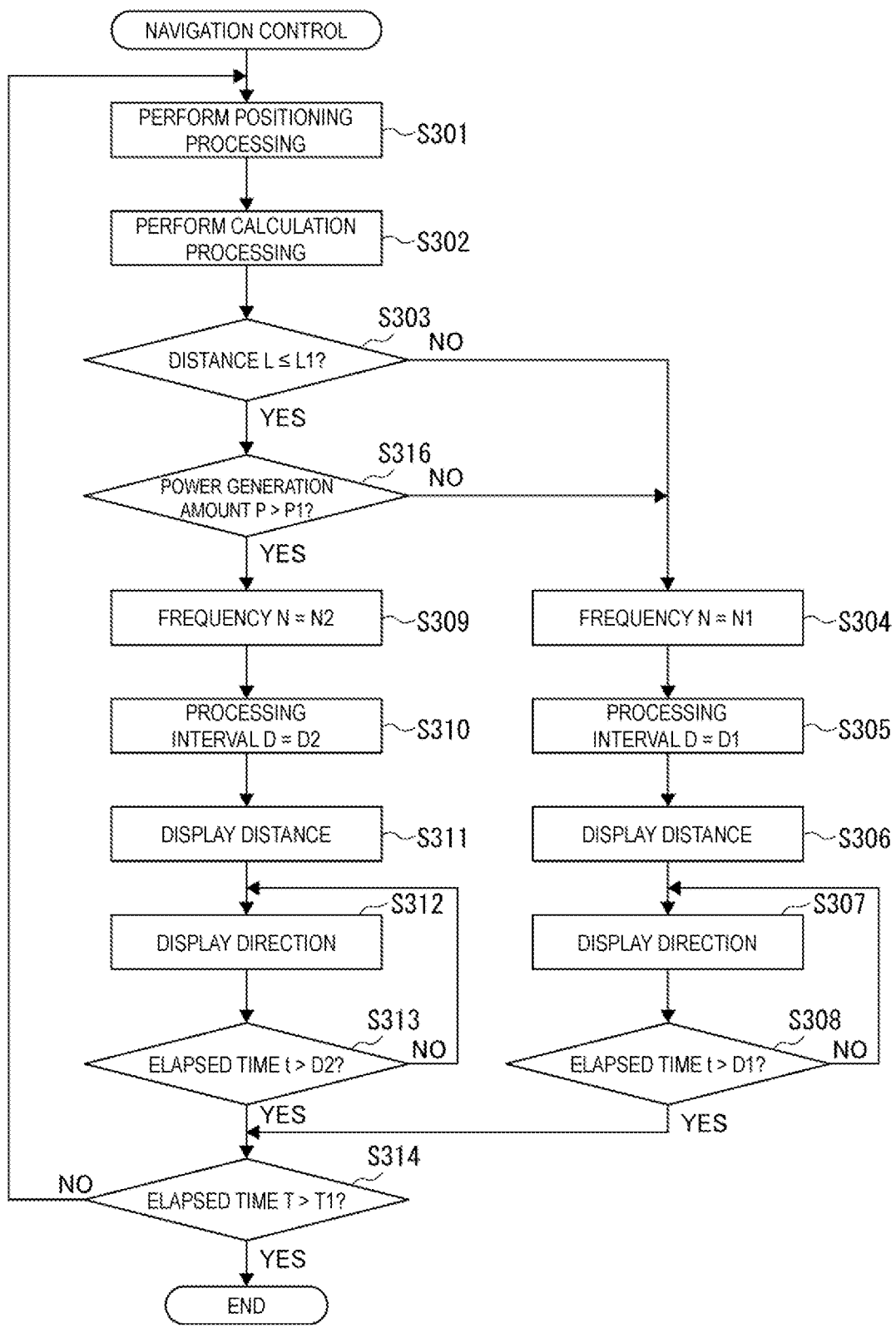
FIG. 10 is a flowchart illustrating navigation processing according to the third embodiment.

FIG. 10 is a flowchart illustrating navigation control according to the third embodiment. Note that, in the third embodiment, steps S301 to S314 are similar to steps S101 to S114 of the first embodiment described above, and thus descriptions of steps S301 to S314 are omitted.

As illustrated in FIG. 10, when the determination in step S303 is Yes, a navigation processing unit 460B determines, in step S316, whether the power generation amount P detected by the power generation amount detection unit 28B is larger than a preset power generation threshold P1.

Here, the power generation threshold P1 is set to, for example, 2 mW.

Then, when the determination in step S316 is Yes, the navigation processing unit 460B sets the frequency N to 180 times, that is, N2, in step S309. Accordingly, the navigation processing unit 460B increases the frequency at which the navigation process is performed when the power generation amount P detected by the power generation amount detection unit 28B is larger than the power generation threshold P1.

On the other hand, when the determination in step S316 is No, the navigation processing unit 460B sets the frequency N to once, that is, N1, in step S304. Accordingly, the navigation processing unit 460B decreases the frequency at which the navigation processing is performed when the power generation amount P detected by the power generation amount detection unit 28B is smaller than or equal to the power generation threshold P1.

Advantageous Effects of Third Embodiment

According to the present embodiment, the following advantageous effects can be produced.

In the present embodiment, the electronic watch 1B includes the solar cell 22 and the power generation amount detection unit 28B configured to detect the power generation amount P of the solar cell 22. The navigation processing unit 460B sets the frequency N to 180 times, that is, N2, when the distance L is shorter than or equal to the preset distance threshold L1 and the power generation amount P detected by the power generation amount detection unit 28B is larger than the preset power generation threshold P1. On the other hand, the navigation processing unit 460B sets the frequency N to once, that is, N1, when the power generation amount P detected by the power generation amount detection unit 28B is smaller than or equal to the preset power generation threshold P1.

Thus, the navigation processing unit 460B also switches, depending on the power generation amount P, the frequency N at which the navigation processing is performed, and can thus suppress an unintentional reduction in battery remaining amount due to the navigation processing.

Modification Example

Note that the present disclosure is not limited to each of the embodiments described above, and variations, modifications, and the like within the scope in which the object of the present disclosure can be achieved are included in the present disclosure.

In the embodiments described above, the navigation processing unit 460, 460A, 460B is configured to use the display control unit 470 to display the distance L and the direction O from the current position to the destination. However, the navigation processing unit 460, 460A, 460B is not limited to this configuration. For example, the navigation processing unit 460, 460A, 460B may be configured to use the display control unit 470 to display only the direction O of the destination.

In the embodiments described above, the navigation processing unit 460, 460A, 460B is configured to set once as N1 and to set 180 times as N2. However, the navigation processing unit 460, 460A, 460B is not limited to this configuration. For example, the navigation processing unit 460, 460A, 460B may be configured to set 10 times as N1 and to set 30 times as N2, and it is sufficient that the navigation processing unit 460, 460A, 460B is configured to set N2 higher than N1.

In the embodiments described above, the navigation processing unit 460, 460A, 460B is configured to set the frequency N at which the navigation processing is performed, at two levels depending on the distance L from the current position to the destination. However, the navigation processing unit 460, 460A, 460B is not limited to this configuration. For example, the navigation processing unit 460, 460A, 460B may be configured to set the frequency N at which the navigation processing is performed, at three or more levels depending on the distance L. For example, when the navigation processing unit 460, 460A, 460B is configured to set the frequency at three levels depending on the distance L, the navigation processing unit 460, 460A, 460B may be configured to set the frequency N to once when the distance L is 1 km or longer, to 18 times when the distance L is shorter than 1 km and longer than or equal to 300 m, or to 36 times when the distance L is shorter than 300 m. In other words, the navigation processing unit 460, 460A, 460B may be configured to set the processing interval D to three minutes when the distance L is 1 km or longer, to 10 seconds when the distance L is shorter than 1 km and longer than or equal to 300 m, or to 5 seconds when the distance L is shorter than 300 m. Thus, the convenience for the user can be further improved and the current consumption can be suppressed.

In the embodiments described above, the electronic watch 1, 1A, 1B includes the digital display unit 120, which is configured to display the distance L. However, the electronic watch 1, 1A, 1B is not limited to this configuration. For example, the electronic watch 1, 1A, 1B may include a pointer, a small window, graduations, or the like for displaying the distance L. In this case, the electronic watch 1, 1A, 1B need not include the digital display unit 120. That is, the electronic watch 1, 1A, 1B may be configured as an analog electronic watch.

In the embodiments described above, the magnetic sensor 80 remains in the On state until the navigation control is ended. However, the magnetic sensor 80 is not limited to this configuration. For example, the magnetic sensor 80 may be configured to be turned off after the navigation processing unit 460, 460A, 460B acquires the geomagnetism once.

In the first embodiment, the electronic watch 1 includes the solar cell 22, the charging circuit 23, and the secondary battery 24, but is not limited to this configuration. For example, the electronic watch 1 may include a primary battery as a power source.

In the second embodiment, the electronic watch 1A includes the primary battery 26A, but is not limited to this configuration. For example, the electronic watch 1A may include a solar cell, a charging circuit, and a secondary battery. In this case, the battery remaining amount detection unit 27A is configured to detect the amount of power of the secondary battery.

In the second embodiment, the navigation processing unit 460A sets the frequency N to once, that is, N1, when the battery remaining amount W is smaller than or equal to the battery remaining threshold W1. However, the navigation processing unit 460A is not limited to this configuration. For example, the navigation processing unit 460A may be configured to set the frequency N to N1 or higher and lower than N2 when the battery remaining amount W is smaller than or equal to the battery remaining threshold W1.

Additionally, in the second embodiment described above, the navigation processing unit 460A may be configured to determine whether or not the battery remaining amount W is larger than the second battery remaining amount threshold W2 set smaller than the battery remaining threshold W1 before performing the first positioning processing and to end the navigation control instead of performing the navigation processing when determining the battery remaining amount W to be smaller than or equal to the second battery remaining amount threshold W2. Thus, when the battery remaining amount W is significantly small, the electronic watch 1A can be inhibited from going down due to execution of the navigation processing.

In the above-described third embodiment, the navigation processing unit 460B sets the frequency N to once, that is, N1, when the power generation amount P is smaller than or equal to the power generation threshold P1. However, the third embodiment is not limited to this configuration. For example, the navigation processing unit 460B may be configured to set the frequency N to N1 or higher and lower than N2 when the power generation amount P is smaller than or equal to the power generation threshold P1.

Additionally, in the second embodiment, the navigation processing unit 460B may be configured to determine, before performing the first positioning processing, whether the power generation amount P is larger than a second power generation threshold P2 set smaller than the power generation threshold P1 and to end the navigation control instead of performing the navigation processing when the power generation amount P is determined to be smaller than or equal to the second power generation threshold P2. In this way, when the power generation amount P is significantly small, the electronic watch 1B can be prevented from going down due to execution of the navigation processing.

In the third embodiment, the electronic watch 1B may include a power amount detection unit capable of detecting the amount of power of the solar cell 22. In this case, the navigation processing unit 460B may be configured to set the frequency N to N2 when the distance L is shorter than or equal to the preset distance threshold L1 and a detected value from the power generation amount detecting unit 28B is larger than the preset power generation threshold P1 or when the distance L is shorter than or equal to the preset distance threshold L1 and the detected value from the power amount detection unit detects is larger than the preset threshold.

Additionally, the navigation processing unit 460B may be configured to set the frequency N to N2 when the distance L is shorter than or equal to the preset distance threshold L1, the detected value from the power generation amount detection unit 28B is larger than the preset power generation threshold P1, and the detected value from the power amount detection unit is larger than the preset threshold.

What is claimed is:

1. An electronic watch comprising:
   a dial in a disc shape with a seconds hand, a minute hand and an hour hand arranged on the dial, the seconds hand, the minute hand and the hour hand rotating around respective shafts to indicate time;
   a receiver configured to receive a satellite signal;
   a positioning processor configured to acquire, based on the received satellite signal, current position information including latitude information and longitude information of a current position;
   a magnetic sensor configured to detect geomagnetism;
   a destination storage unit configured to store destination position information including latitude information and longitude information of a destination;
   a navigation processor configured to perform navigation processing of causing the positioning processor to perform positioning processing, and calculating a distance to the destination based on the current position information acquired by the positioning processing and the destination position information, and also calculating a direction of the destination based on the current position information, the geomagnetism, and the destination position information, and moreover causing a destination-pointing hand to display the direction of the destination, and causing a North-pointing hand, different from the destination-pointing hand, to display North orientation based on the geomagnetism detected by the magnetic sensor during the navigation processing;
   an operation device configured to cause the navigation processor to start the navigation processing when a predetermined operation is performed,
   a solar cell; and
   a power generation amount detector configured to detect a power generation amount of the solar cell,
   wherein the navigation processor
     performs, when the distance is longer than a preset threshold, the navigation processing at a first frequency during a predetermined time after the predetermined operation is performed, performs, when the distance is shorter than or equal to the preset threshold and a detected value detected by the power generation amount detection unit is smaller than or equal to a predetermined threshold, the navigation processing at the first frequency during the predetermined time, and performs, when the distance is shorter than or equal to the preset threshold and the detected value detected by the power general amount detection unit is larger than the predetermined threshold, the navigation processing at a second frequency higher than the first frequency during the predetermined time.

2. The electronic watch according to claim 1, comprising:
a battery configured to supply power; and
a battery remaining amount detector configured to detect a battery remaining amount of the battery, wherein
the navigation processor performs the navigation processing at the second frequency when the distance is shorter than or equal to a preset threshold and a detected value detected by the battery remaining amount detector is larger than a preset threshold.

3. The electronic watch according to claim 2, wherein the navigation processor causes the destination-pointing hand to display the distance to the destination in the navigation process.

4. The electronic watch according to claim 1, wherein the navigation processor causes the destination-pointing hand to display the distance to the destination in the navigation process.

\* \* \* \* \*